United States Patent [19]

Bukhteev et al.

[11] Patent Number: 4,501,059
[45] Date of Patent: Feb. 26, 1985

[54] MACHINE FOR LAYING CONDUCTORS INTO SLOTS

[75] Inventors: Pavel I. Bukhteev, Moscow; Grigory Y. Posleider, Kherson; Viktor M. Kartavtsev, Kherson; Vladimir S. Bytsak, Kherson, all of U.S.S.R.

[73] Assignee: Nauchno-Issledovatelsky I Experimentalny Institut Avtomovilnogo Elektrooborudovania I Avtopriborov, Moscow, U.S.S.R.

[21] Appl. No.: 367,810

[22] Filed: Apr. 13, 1982

[51] Int. Cl.³ .................................................. H02K 15/00
[52] U.S. Cl. ...................................... 29/564.5; 29/596; 29/732
[58] Field of Search .................... 29/564.5, 732, 733, 29/735, 564.3, 564.6, 564.8, 33 L, 33 K, 596, 29/736

[56] References Cited

U.S. PATENT DOCUMENTS

| | | | |
|---|---|---|---|
| 2,074,366 | 3/1937 | Collins et al. | 29/564.5 |
| 3,156,037 | 11/1964 | Warner | 29/564.5 |
| 3,514,837 | 6/1970 | Smith | 29/732 X |
| 3,593,758 | 7/1971 | Sergiev | 29/732 X |
| 3,608,176 | 9/1971 | Wieckhorst | 29/732 |
| 3,747,188 | 7/1973 | Böke et al. | 29/732 X |
| 3,778,889 | 12/1973 | Mason | 29/596 |
| 3,818,570 | 6/1974 | Del Bond | 29/564.5 |
| 4,207,669 | 6/1980 | Andrev et al. | 29/564.5 |

FOREIGN PATENT DOCUMENTS 245188 11/1970 U.S.S.R. ............................ 29/564.5

*Primary Examiner*—William R. Briggs
*Attorney, Agent, or Firm*—Burgess, Ryan & Wayne

[57] ABSTRACT

A machine for making conductors of sections of a winding of electrical machine and for laying these conductors into the slots of an electrical machine comprises the following units arranged in an assembly line: an unreeling device, straightening rollers, a wire feed mechanism, a device for stripping portions of the wire, a cut-off device, a receiving tray, a mechanism for setting and turning the armature of the electrical machine, and a mechanism for insertion and lay-out of the wires in the slots of the armature and commutator of the electrical machine. The mechanism for setting and turning the armature of the electrical machine is made in the form of centers provided with a ratchet gear. The mechanism for insertion and lay-out of the wires of the winding of the slots of the armature and commutator is made in the form of a rotary disc with a slot and two pushers. The invention makes it possible to fully automate the process of making the windings of electrical machines and enables one to eliminate manual labor when putting the conductors of the winding sections into the slots of the electrical machine, to improve the labor conditions and to increase productivity.

2 Claims, 1 Drawing Figure

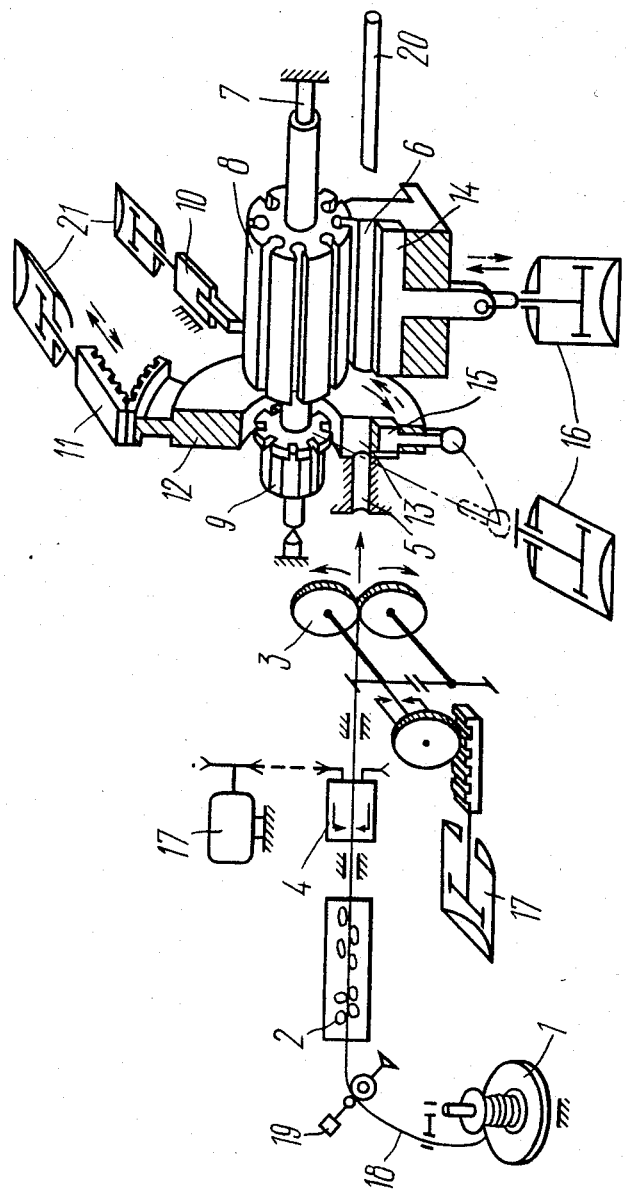

4,501,059

MACHINE FOR LAYING CONDUCTORS INTO SLOTS

FIELD OF THE INVENTION

The present invention relates to equipment for making and laying the wires of windings of electrical machines and, more particularly, the invention relates to machines for making conductors of sections of a winding and for laying them into the slots of a electrical machine.

The instant invention may be used in electromechanical engineering.

BACKGROUND OF THE INVENTION

In modern electrical engineering sections of wires of windings for electrical machines are made in special automatic machine tools, where cut wire lengths are laid into a receiving tray. Known in the art is a machine for making and laying the conductors of the winding sections into the slots of an electrical machine (cf. USSR Inventor's Certificate No. 245,188, IPC[2] HO2 G 1/12) comprising the following units arranged in line: an unreeling device, straightening rollers, a wire feed mechanism, a wire stripper, a cut-off device, and a receiving tray. After the conductors of the sections have been laid into the receiving tray, the armature of the electrical machine is assembled by inserting the sections of the winding into the slots.

The most labor consuming operations, which are difficult to automate, consist in laying the sets of wire sections into the slots of the magnetic circuit, lay-out and insertion of the ends of the wires into the commutator slots.

As a rule, these operations are performed manually with high proportion of hand labor because the prepared lengths of wire cannot be loaded into a bin due to their length, low rigidity, mixing up and unstable shape. Thus, the known machine does not satisfy the requirements of automation for the next steps of winding the electrical machine. The lengths of wire of the sections of the winding are thrown into a receiving tray, and the wire sections are manually laid into the slots of the electrical machine. Therefore, there is no automatic laying of conductors of the sections of the winding into the slots of the electrical machine.

SUMMARY OF THE INVENTION

An object of the invention is to provide a machine for making conductors of sections of a winding and for automatic laying of these conductors into the slots of the electrical machine.

This object is attained by providing a machine for making conductors of sections of a winding and laying these conductors into the slots of an electrical machine comprising the following units arranged in a technological line: an unreeling device, straightening rollers, a wire feed mechanism, a device for stripping portions of the wire, a cut-off mechanism, a receiving tray; according to the invention, the machine includes a mechanism for setting and turning the armature of the electrical machine made in the form of centres with a ratchet mechanism mounted in parallel to the receiving tray and a mechanism for insertion and layout of the wires of the windings in the slots of the armature and commutator made in the form of a rotary disc with a slot positioned coaxially to the centres adjoining the receiving tray, and two pushers mounted in the slot of the rotary disc and in receiving tray opposite to the armature and commutator of the electrical machine respectively.

The present invention makes it possible to automate the process of winding of electrical machines and to eliminate the manual labor when inserting the conductors of the sections of the winding into the slots of the magnetic circuit and commutator, improve the labor conditions and increase the labor productivity by a factor of 2.5 to 3.

The invention is further described by way of example with reference to the accompanying drawing which shows a general schematic diagram of the machine for making conductors of sections of a winding and for laying the conductors into the slots of an electrical machine, according to the invention.

DETAILED DESCRIPTION OF THE INVENTION

The machine for making conductors of sections of a winding and for laying them into slots of an electrical machine (in this case for armatures of automotive starters) comprises the following units arranged in a technological line:

an unreeling device 1, straightening rollers 2, a wire feed mechanism 2, a wire stripping device 4, a receiving tray 6. The machine also comprises a mechanism 7 for setting and turning the armature 8 and commutator 9 made in the form of centres with a ratchet gear 10 installed in parallel to the receiving tray 6, a mechanism 11 for insertion and lay-out of the wire of the windings through the slots of the armature 8 and commutator 9. The mechanism 11 is made in the form of a rotary disc 12 with a slot 13 and two pushers 14 and 15 mounted in the slots of the rotary disc 12 in the receiving tray 6, opposite to the slots of the commutator 9 and armature 8 respectively.

The rotary disc 12 with a slot 13 mounted coaxially to the centres, said slot adjoining the cut-off device 5 at one side and the receiving tray at the other side. The accompanying drawing shows wires 16, 17 of the mechanism 11 for insertion and lay-out of the wires through the slots of the armature and commutator 9 and the wire feed mechanism 3 respectively. The wire 18 passes through the safety mechanism 19 of the machine.

The accompanying drawing also shows a cutaway view of an end portion of a section 20 of the wire 18 for forming a portion of the winding of the starter armature, a drive 21 for reciprocating the mechanism 11 for insertion and lay-out of the wires of the windings in the slots of the armature 8 and commutator 9 and the ratchet gear 10. The end portion of the wire section 20 is shown in its position prior to insertion of an adjacent portion thereof into one of the armature slots. Each section 20 extends from (i) the region where the cutoff device 5 meets the slot 13 of the disk 12, to (ii) the end portion thereof shown at the right side of the drawing.

The pointers in the accompanying drawing show the direction of motion of the wire feed mechanism 3, rotary disc 12, mechanism 11 for insertion and lay-out of the wire in the slots of the armature 8 and commutator 9, and drive 16.

The armature 8 with a commutator 9 is installed in the centers and is fixed in the angular position by the ratchet gear 10 so that one of its slots coincides with the slot of the receiving tray 6. In this case the slot of the armature 8, which is in the magnetic circuit, is located opposite to the pusher 14, and the slot of the commutator 9 is located oposite to the pusher 15.

The machine for making conductors of sections of a winding and for laying these conductors into the slots of an electrical machine operates as follows.

During the start-up of the machine the wire 18 passes through the safety mechanism 19 switching off the machine if the wire 18 is excessively bent, twisted and tangled in the coil of the unreeling device 1 as well as in the case of its breaking or complete unwinding of the wire from the coil of the unreeling device 1. Then the wire 18 is drawn through the straightening roller 2 and the wire stripping device 4 for stripping limited sections of the wire corresponding to the ends of the wire sections 20 by means of the rollers of the wire feed mechanism. When the wire 18 is pulled through the wire stripping device or when it is stationary, the insulating enamel of the wire 18 is removed from a predetermined length of the wire by a known method, e.g. by high-speed roller cutters, riffled straps, metal brushes (not shown), thermal or chemical action, etc.

Further the wire 18 is forced by the rollers of the wire feed mechanism 3 through the opening of the cut-off device 5 into the slot 13 of the rotary disc 12 and receiving tray 6, which are in the same plane coinciding with the plane of the slot of the armature 8.

After the feed of the wire 18 for a definite distance by the rollers of the wire feed mechanism 3 has been ceased, the wire is inserted into the slot of the armature 8 by the pusher 14.

After that the rotary disc 12 turns towards the simultaneously rotating armature 8 for one slot division. During these movements a blank comprising the section 20 of the wire 18 forming a portion of the winding of the armature 8 is cut off by the device 5 and one end of each such blank is laid-out in the slots of the commutator 9. At the end of this combined movement the slot 13 together with the pusher 15 is placed opposite to the slot of the armature 8 in accordance with the lay-out scheme and the reciprocating drive gear 16 forces the pusher 15 to insert one end of the wire section 20 into the slot of the commutator 9. After the end of the section 20 of the armature winding has been pushed into the slot of the commutator 9, the rotary disc 12 returns to its initial position, where the slot 13 is again placed in the same plane with the stationary part of the cut-off device 5 and the receiving tray 6 to be able to push through these devices the next blank of the section 20 of the winding by the wire feed mechanism 3. Then the cycle is repeated until a complete set of sections 20 of the armature winding is provided. The machine allows each wire section 20 to be stripped at both ends because the stripped portion equal to the double length of the stripped end of a single blank is cut into two parts.

After the process of winding of one armature has been completed, the cycle is interrupted, the armature is removed from the machine and transferred to the next automatic machine of the technological line.

Thus, the machine herein described makes it possible to automate one of the most labor consuming operations in the process of assembly of windings of electrical machines, namely: laying of conductors of the sections of a winding of the magnetic circuit and commutator. As a result, manual labor is eliminated, labor conditions are improved and labor productivity is increased by 2.5 to 3 times.

What is claimed is:

1. A machine for making conductor sections from insulated wire and for installing said sections in armature slots of an electrical machine with ends of said sections installed in peripheral slots of a commutator for said armature according to a predetermined layout, said armature slots being oriented parallel to the axis of rotation of said armature, said commutator having a peripherally slotted portion coaxial with said armature and disposed adjacent to and axially spaced from a first end of said armature, said machine comprising:
   (a) an unreeling device for providing insulated wire;
   (b) a device for feeding and straightening the wire provided by said unreeling device;
   (c) feeding means for intermittently feeding predetermined lengths of the wire straightened by said device;
   (d) stripping means for removing the insulation from the portion of said wire corresponding to the end of each of said predetermined lengths and the beginning of the next succeeding predetermined length of the wire fed by said feeding means;
   (e) cutting means for cutting the wire intermittently fed by said feeding means into predetermined cut lengths, said cutting means being aligned with said stripping means so that both ends of each cut length of wire are stripped of insulation;
   (f) a receiving tray having a slot aligned with said cutting means for receiving successive cut lengths of said wire;
   (g) mounting means for mounting the armature and commutator for rotation about the axis of rotation thereof, with the armature slots disposed parallel and adjacent to the slot of said receiving tray, and the slotted portion of said commutator disposed adjacent said cutting means;
   (h) indexing means for rotating said armature and commutator so that successive armature slots are brought into alignment with the slot of said receiving tray;
   (i) first pusher means operatively associated with said receiving tray and mounted for intermittent reciprocating movement toward and away from said armature to install each cut length of wire disposed in the slot of said receiving tray, in a corresponding armature slot;
   (j) a rotary disk at least partially surrounding and coaxial with the slotted portion of said commutator, said disk adjoining said cutting means and being rotatable about said axis, said disk having a portion alignable with said cutting means for engaging one end of each cut length of wire;
   (k) positioning means for rotating said disk to bring an end of each cut length of wire into alignment with a corresponding slot of said commutator according to said predetermined layout; and
   (l) second pusher means operatively associated with said rotary disk and mounted for intermittent reciprocating movement toward and away from said slotted portion of said commutator, to install each said one end of each said cut length of wire in the corresponding commutator slot.

2. A machine for making conductors of sections of a winding and for laying these conductors into slots of an electrical machine with an armature and a commutator, comprising:
   (a) an unreeling device for providing wire to be inserted into an electrical machine;
   (b) a device for receiving and straightening the wire;

(c) a means for intermittently feeding a predetermined length of wire;
(d) means for stripping a portion of the wire;
(e) means for cutting a predetermined length of the wire intermittently fed by the feeding means;
(f) a receiving tray for receiving the length of wire;
(g) means for mounting and turning the armature and commutator of said electrical machine;
(h) means for indexing the slots in the armature and the commutator with the receiving tray comprising a ratchet gear which also turns said armature and commutator;
(i) a rotary disk with a slot for insertion and laying out of the wire of the windings through the slots of the armature and commutator installed coaxially with said armature and commutator adjoining said cutoff device on one side and said receiving tray on the other side; and
(j) two pushers installed in the slots of the rotary disk and the receiving tray respectively opposite the slots of the armature and the commutator of said electrical machine, and means for operating said pushers to insert said wire into the slots.

* * * * *